Dec. 28, 1943.     M. E. COLLINS     2,337,974
NOISE REDUCTION MEASURING SYSTEM
Filed April 22, 1940     2 Sheets-Sheet 1

INVENTOR.
MILFORD E. COLLINS,
BY
ATTORNEY.

Dec. 28, 1943.　　　M. E. COLLINS　　　2,337,974
NOISE REDUCTION MEASURING SYSTEM
Filed April 22, 1940　　　2 Sheets-Sheet 2
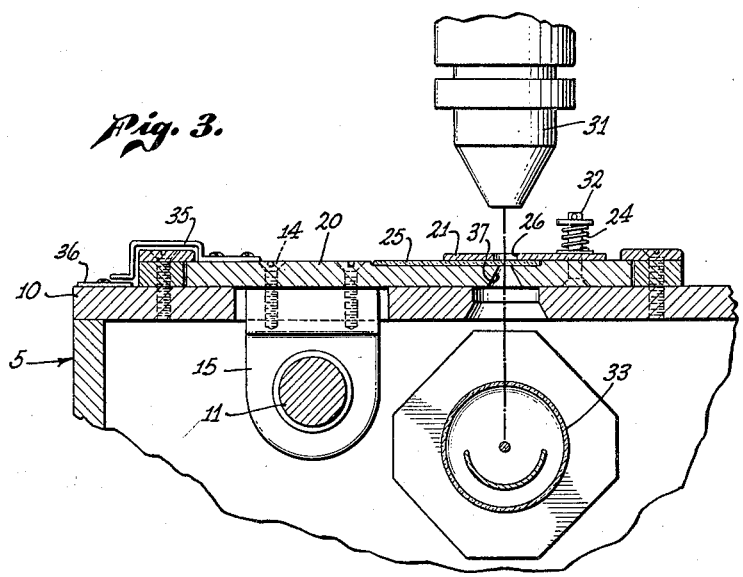
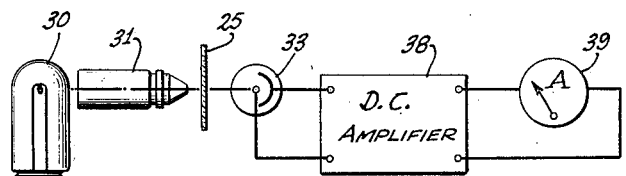
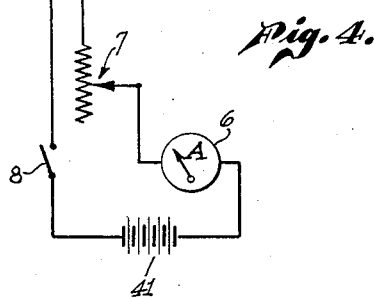
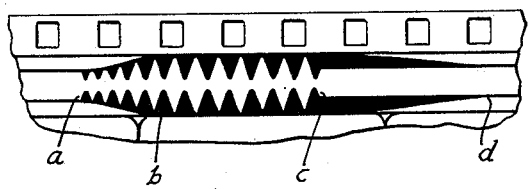
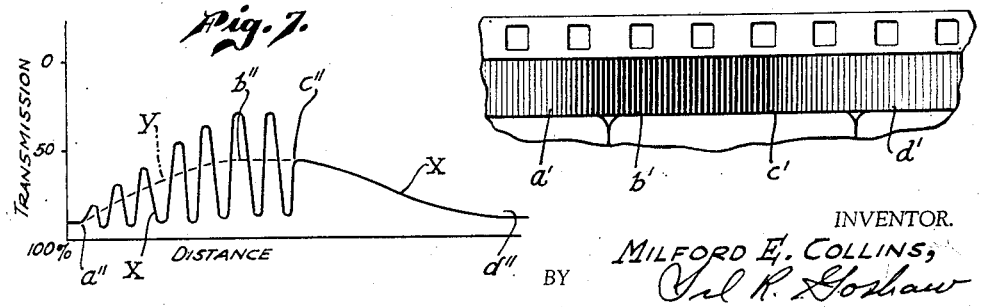
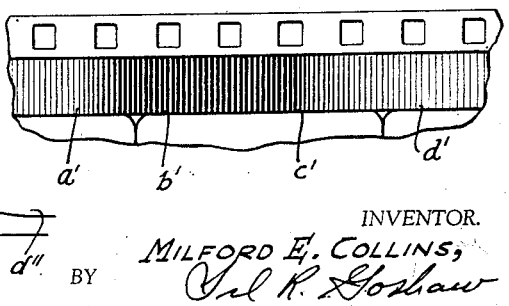
INVENTOR.
MILFORD E. COLLINS,
BY
ATTORNEY.

Patented Dec. 28, 1943

2,337,974

UNITED STATES PATENT OFFICE 2,337,974

NOISE REDUCTION MEASURING SYSTEM

Milford E. Collins, Los Angeles, Calif., assignor to Radio Corporation of America, a corporation of Delaware Application April 22, 1940, Serial No. 330,907

6 Claims. (Cl. 88—14)

This invention relates to testing and measuring apparatus and particularly to a device for measuring variations in photographic densities to determine operating characteristics of a sound recording system or other film photographic apparatus.

It is well known that noise reduction in various forms is applied to sound film recording systems. In the variable area type of sound recording, wherein a trace or traces longitudinally of the film separate opaque and transparent areas, noise reduction may be applied in the original recording either in the form of a shifting of the mean line of the modulations or by utilizing a shutter which eliminates the light from the unmodulated portion or portions of the sound track area. In the variable density type of recording systems, noise reduction is applied on the negative by biasing the modulation point along the density characteristic curve of the emulsion so that, at low modulations or times of no signal, very little light is impressed upon the film and the average density increases with the increase in the amplitude of the modulations.

In either of the systems described above, adjustments are made to provide an optimum opening and closing time for the noise reduction portion of the system. With variable area recording, the result of the timing adjustments may be observed by simply inspecting the negative film after processing, it being possible to make a measurement between the point where the mean line or the shutter begins to shift and the point where it has reached full track modulation. These tests may be made with only the action of the noise reduction portion of the system being recorded, or a constant frequency tone or complex signal may be abruptly impressed and recorded for test purposes. Methods of adjusting the noise reduction timing circuits are disclosed and claimed in United States Patent 1,999,700.

Although the above tests are comparatively simple with variable area recording, it is impossible to measure the results of adjustments in a variable density track in the same manner because of the nature or form of the track, such a track being made up of a series of striations of varying widths and densities according to the frequency and amplitude of the signal. In this type of system, the variations in average density are not observable by inspection to enable an observer to determine the actual beginning and ending of the light variations caused by the noise reduction action.

The present invention, therefore, is directed to a device which quickly facilitates the determination of the noise reduction action applied to variable density recording systems; and, the principal object of the invention, therefore, is to accomplish this result.

Another object of the invention is to provide a means for measuring small changes in density longitudinally of a film over small increments of length.

A further object of the invention is to provide a direct reading densitometer for photographic densities.

A further object of the invention is to provide a densitometer for directly determining the instantaneous variations in density along a photographic sound track from any cause whatsoever.

Although the novel features which are believed to be characteristic of this invention are pointed out with particularity in the claims appended hereto, the manner of its organization and the mode of its operation will be better understood by referring to the following description read in conjunction with the accompanying drawings forming a part thereof, in which Figure 1 is an elevational view partly in cross-section showing the invention;

Figure 3 is a cross-sectional view taken along the line 3—3 of Figure 1;

Figure 4 is a diagrammatic circuit arrangement employed in the invention;

Figure 5 is a detailed section of a variable area negative sound track having noise reduction;

Figure 6 is a detailed section of a variable density negative sound track having noise reduction; and Figure 7 is a graph illustrating the method of obtaining the timing values with the invention.

Figure 1:
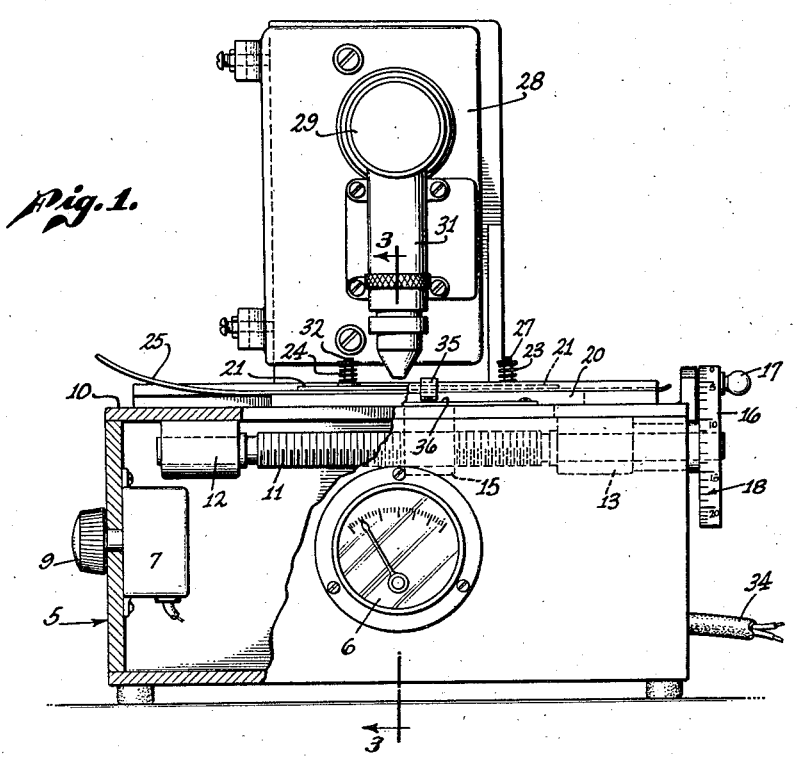

Referring now to the drawings in which the same numerals identify like parts, a lower housing 5 constituting a supporting framework has mounted on the front wall thereof an ammeter 6 and on an end wall, a rheostat 7 with a control knob 9 and a switch 8. Mounted within the housing 5 and attached to the upper base plate 10 by bearing brackets 12 and 13 is a finely threaded shaft 11 threaded through a movable carrier block 15. The shaft 11 extends through the end of the casing 5 and has mounted thereon a wheel 16 having a hand knob 17. On the outer circumference of the wheel, there is inscribed a measuring indicia scale 18 divided into fifty divisions.

The carrier block 15 is attached by screws 14 to a film carrier 20 having a film holding plate 21 mounted thereon under pressure of a pair of coil springs 23 and 24 surrounding screws 27 and 32. Thus, rotation of the wheel 16 will cause the block 15 and carrier 20 to travel longitudinally of the axis of the shaft 11. Thus, if a film 25 is positioned between the holding or pressure plate 21, which has a slot 26 therein (see Fig. 3) and the plate 20, which has a slot 37 therein, it will be moved along with the plate 20. The slots 26 and 37 are positioned over and under, respectively, the sound record portion of the film.

Figure 2:
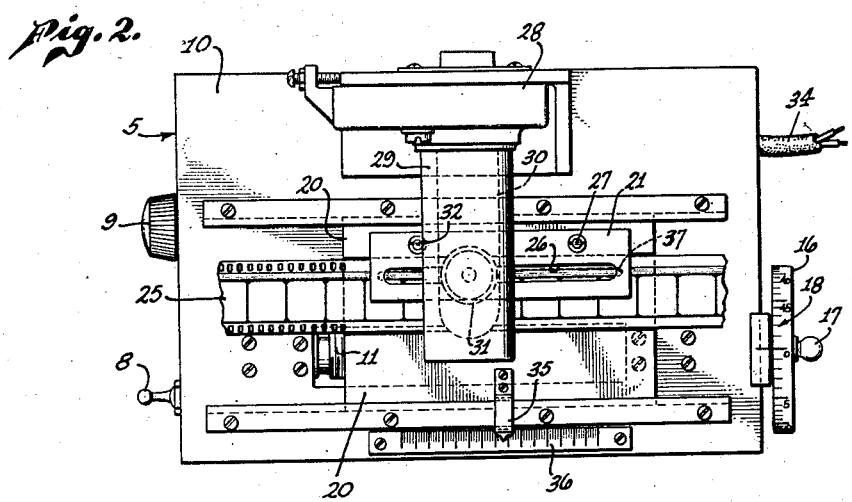
Figure 2 is a plan view of the invention.

Supported on top of the casing 5 is a second casing 28 upon which is mounted a lamp housing 29 enclosing a lamp 30 shown in dotted lines in Fig. 2. The light from the lamp 30 is projected as a narrow beam to the sound track on the film 25 by an optical assembly 31, energy for the lamp being supplied through the rheostat 7 under control of the switch 8.

Located within the housing 5 is a photoelectric cell 33, the output of which is carried outside of the housing 5 by a low capacity cable 34. As will be noted in Fig. 2, the carrier plate 20 has mounted thereon an index pointer 35 which travels over a stationary scale 36, the scale 36 being divided into divisions of 50 thousandths each, which is equal to one revolution of the wheel 16. Thus, the scale 36, in conjunction with the scale 18 on the wheel 16, forms an accurate measuring device for small increments of film movement, since the scale 18 on wheel 16 is divided into fifty divisions, each of which represents $\frac{1}{1000}$ of an inch movement of the film.

Referring to Fig. 4, it will be observed that the lamp 30 projects light through the optical projection assembly 31, through the film 25, to the photoelectric cell 33. The output of the cell is amplified in a direct current amplifier 38 and is then fed into a micro-ammeter 39 of extreme sensitivity. The lamp 30 is fed from a source of potential 41 under control of the rheostat 7 and switch 8, measurement of the current to the lamp being obtained on the ammeter 6. By the controls 6 and 7, a certain lamp current may be obtained and maintained constant during a measurement.

Referring now to Fig. 5, an example of a variable area negative sound record having noise reduction is shown wherein the central portion shows the modulations of a constant frequency, such as a thousand cycles, and the outer portions show the action of a pair of shutters which separate as the signal is applied and which come together after the signal is removed. In order to test the speed or acceleration of the shutters with signal impression, the time between the point $a$, where the shutters start to move, and the point $b$, where they have reached full opening, is desired, while the time between point $c$, where the signal is cut off, and point $d$, where the shutters have returned to normal, will provide the closing time. The illustration is a severe test wherein a signal at full amplitude is impressed on the system, and the clipping of peaks is observable.

With the type of track shown in Fig. 5, it will be noted that, by simple observation, the noise reduction timing may be determined by measurement of the distance between the points $a$ and $b$ and between points $c$ and $d$, since it is known that the film travels at a constant speed of ninety feet per minute, or 18 inches per second. Now, Fig. 6 shows the same modulation and noise reduction action applied to a variable density track, and it will be noted that not only is it impossible to sharply determine by inspection the points $a'$, $b'$, $c'$ and $d'$, corresponding to points $a$, $b$, $c$ and $d$ of Fig. 5, but that the variations or rate of change in the noise reduction action cannot be observed. It is difficult to depict in such a drawing the actual appearance of the variable density record, since a uniform average density exists during times of no signal. The attempt to show this condition in the drawing is by the narrow, widely spaced lines. However, the piece of film shown in Fig. 6 may be quickly measured with the invention, and the point $a'$, where the steady average transmission begins to vary, is readily determined, as well as the point at which the average density becomes constant, corresponding to $b'$. The points $c'$ and $d'$ for the closing period may be similarly found. A preferred method of determining these points is as follows:

Referring now to Fig. 7, a timing characteristic curve obtained from the record of Fig. 6 is shown, the abscissa representing the film movement as measured by scales 18 and 36, and the ordinate representing the film transmission as measured on meter 39. The full line curve obtained with the invention is similar to the variable area modulation curve of Fig. 5, and is obtained by plotting a plurality of points which represent the instantaneous values of the transmission over the critical length of the film. The negative film will have a constant transmission over the length of film having no signal thereon, this transmission being slightly less than 100% because of the carrier density of the track. The signal modulation and noise reduction action will then vary the measurements to produce the solid curve X. Now by a line drawn between the peaks of the solid curve X, the dotted curve Y is obtained, this curve being flattened at the top where full track modulation extends along the record. This dotted line represents the variation in the average transmission through the film and, consequently, the "opening" characteristic of the noise reduction portion of the recording system. When the signal is removed, the transmission will increase to the value of the no-signal carrier transmission.

Now, a distance between the points $a''$ and $b''$ of 180 thousandths will represent an opening time of 10 milliseconds, since the film travels at the rate of .018 inch per millisecond. The closing time will be obtained in the same manner. The shape of curve Y, including the solid curve X between points $c''$ and $d''$, provides an indication of the rate of opening and closing at various amplitudes and will provide an indication of the margin such as is shown by the clipped peaks in Fig. 5. For a more rapid determination of the general shape of the dotted curve Y, only the minimum transmission points may be plotted, the curve thus following the peaks of the sinusoidal portion of the curve X.

Although the invention may be used as a regular densitometer, since percentage transmission is the reciprocal of density, it is particularly useful for locating and determining extraneous and deleterious modulations introduced into either a variable density or variable area record. For instance, a 96 cycle sprocket tooth ripple or a modulation caused by mechanical vibration might be present at some unknown frequency. These may be located by measuring a strip of the variable density sound record, and the plotted curve, similar to curve X, will show the presence and frequency of the vibration.

It is to be understood that the above type of densitometer may provide a direct reading of density by suitable meter calibration, while the scales 36 and 18 may be calibrated to directly read the noise reduction timing in milliseconds, thus facilitating the rapidity of making measurements. The device may also be employed on variable area recordings wherein the action of the noise reduction units is not particularly observable by inspection, such as in the case of noise reduction action with complex sound waves. In actual use, this invention has materially shortened the time required for making timing measurements, as well as for determining normal film densities.

What I claim as my invention is:

1. A system for determining the average variation in density over a modulated variable density record comprising means for generating and directing a narrow beam of light across said record, a carriage for holding said record in a fixed plane with respect to said light beam, a finely threaded screw connected to said carriage, rotation of said screw moving said record in said fixed plane, a frame for said carriage having indicia thereon for indicating relatively large increments of movement of said carriage, means for rotating said screw, said means having indicia thereon for indicating the amount of rotation of said screw and relatively small increments of movement of said carriage within the increments of said frame indicia, the combination of said indicia providing indications of movement of said record comparable to the modulations of said record, and means for measuring the light emerging from said record at each indicated point of movement of said record.

2. In combination, a light source, a supporting framework, a horizontally movable carriage on said framework for supporting a film having a sound record thereon, a light sensitive cell, means for projecting a light beam from said source through said film record to said cell, a fine-pitched screw for moving said film carriage and said film bodily as a unit on said framework in small increments transversely of said light beam, cooperative means on said framework and said carriage for indicating relatively large increments of movement of said carriage on said framework, means associated with said screw for indicating relatively small increments of movement of said carriage on said framework, the increments of said last-mentioned means being proportional divisions of said first-named indicating means, and means for measuring the light from said source impinging on said cell as said film is moved in said increments.

3. In combination a light source, a supporting framework, a carriage movably mounted on said framework for supporting and holding a film in a fixed plane, a light sensitive cell, means for projecting a light beam from said source through said film record in a narrow beam longitudinally of said record, the emergent light impinging on said cell, a screw positioned parallel with the plane of movement of said carriage, means for attaching said carriage to said screw, the rotation of said screw moving said film and said carriage bodily as a unit on said framework transversely of said light beam, means for measuring the output of said cell, cooperative means on said framework and said carriage for measuring small increments of movement of said carriage on said framework, and means associated with said screw for measuring the amount of rotation of said screw, one revolution of said screw corresponding to a division of said first-named measuring means.

4. A system for determining the average density variation of a film record comprising a supporting framework, a carriage movably mounted on said framework for supporting said film record in a fixed plane, means for directing a narrow beam of light on said film record, means for moving said film and said carriage bodily as a unit on said framework transversely of said light beam, said last named means including a screw connected to said carriage for moving said film and said carriage, cooperative means on said framework and said carriage for directly measuring the increments of movement of said carriage on said framework, means associated with said screw for directly measuring the amount of rotation of said screw, said screw rotation measuring means indicating increments of movement of said carriage not indicatable on said first-named measuring means, and means for measuring the light transmission through said film record at each increment of movement of said film.

5. A film density measuring device comprising a supporting framework, a horizontally movable carriage on said framework for supporting a film, means for maintaining said film on said carriage in a fixed plane, means for projecting a narrow beam of light through said film, a light sensitive device for measuring light emerging from said film, a horizontal screw connected to said carriage and adapted to move said film and said carriage bodily as a unit on said framework upon rotation of said screw, a wheel for turning said screw, said wheel having indicia thereon for measuring the amount of rotation of said screw, and indicia mounted on said framework in association with said carriage for measuring relatively large increments of movement of said carriage on said framework, said wheel indicia being proportionately related to the indicia on said framework to provide indications of particularly small increments of movement of said carriage on said framework.

6. A film density measuring device in accordance with claim 5 in which said light projection means includes means for varying and indicating the intensity of said light beam.

MILFORD E. COLLINS.